3,520,826
CATALYST COMPOSITIONS AND THEIR
PREPARATION
Kenjiro Tanaka, Hideo Konuma, Katsuhiro Ono, Yoshinobu Tachibana, Hiroshi Ichikawa, and Toshihide Nishimura, Tokuyama-shi, Japan, assignors to Idemitsu Kosan Co., Ltd., Tokyo, Japan, a corporation of Japan
No Drawing. Filed Feb. 14, 1967, Ser. No. 615,905
Claims priority, application Japan, Nov. 21, 1966, 41/76,151
Int. Cl. C08f 3/02, 7/02; C08d 3/04
U.S. Cl. 252—429
4 Claims

ABSTRACT OF THE DISCLOSURE

This invention relates to a novel catalyst composition useful for the polymerization of $\alpha$-olefins, which comprises (1) an organometallic compound of a transition metal of Groups IV to VI and Group VIII of the Periodic Table and (2) the halide of a transition metal of Groups IV to VI and Group VIII of the Periodic Table.

---

Various catalysts effective for the polymerization of olefins have been proposed in the literatures. Among these, so-called Ziegler catalysts are most commonly known as a fundamental catalyst system. Many modifications of such catalyst systems are also known. All of these, however, can be considered as two-component or multi-component systems comprising a metal of Groups 1 to III of the Periodic Table or a compound thereof (which may be an organometallic compound or metal halide or metal hydride) and a compound of a transition metal of Groups IV to VIII of the Periodic Table. Other polymerization catalysts involve a catalyst system based on the combination of at least two metallic compounds of Groups IV to VI of the Periodic Table. Typically known are $$Sn(C_2H_4)_4\text{—}VCl_4$$

(Fr. addn. 70,421), $CH_3TiCl_3$—$VCl_4$ (J. Polymer Science 50, 143 (1961), $WCl_6$—$Sn(C_4H_9)_4$ (U.S. Pat. 2,872,439) and soluble titanium compound-titanium halide (U.S. Pat. 2,992,212).

We have now found that monomeric $\alpha$-olefins can be polymerized if a certain organometallic compound of a metal of Groups IV to VI and VIII of the Periodic Table is used as a catalyst component in combination with a halide of a transition metal of Groups IV to VI and VIII of the Periodic Table. The catalyst system used here is entirely new and is independent of the Ziegler type catalysts. Further, it is distinguished from the aforementioned Sn—V, Ti—V, W—Sn and Ti—Ti type catalysts in view of its markedly higher catalytic activity which is rather comparable to that of the Ziegler catalyst.

It has heretofore been unexpected that a catalyst which is free of any element of Groups I, II and III of the Periodic Table would be effective for the polymerization of $\alpha$-olefins.

Suitable $\alpha$-olefins which can be polymerized by use of a catalyst composition according to the invention include ethylene, propylene, 1-butene, styrene, etc.

In accordance with the present invention, there is provided a novel catalyst composition which comprises two components as described hereafter.

The first component useful in the catalyst composition of the invention is an organometallic compound of a transition metal of Groups IV to VI and Group VIII of the Periodic Table. Such organometallic compound may be an allyl-diene compound of the formula $$[(CH_2\!\!=\!\!CH\text{—}CH_2)_m Me(diene)_n]_x$$

wherein Me is a transition metal of Groups IV to VI and VIII of the Periodic Table, diene means a hydrocarbon containing a diene linkage, such as butadiene, isoprene, hexadiene, cyclopentadiene or cyclooctadiene, $m$ is a positive interger of not more than 4, $n$ is a positive integer of not more than 2, and $x$ is 1 or 2. Suitable organometallic compounds as the first component of the present invention include, for example, an allyldiene compound of titanium, zirconium, vanadium, niobium, tantalum, chromium, molybdenum, tungsten, cobalt, etc. The essential requirement of the first component is that said component have a reducing ability for the transition metal halide mentioned hereafter.

The second component to be used in the catalyst composition of the invention is a halide or oxyhalide of a transition metal of Groups IV to VI and Group VIII of the Periodic Table. Typical transition metal halides usable herein are the halides of titanium, zirconium, vanadium, niobium, tantalum, molybdenum, tungsten, nickel, etc. It is to be understood that the term "halides," used herein includes the corresponding oxyhalides.

Particularly preferred as specific combinations of the first and second components are titanium halide with the allyl-diene compound of chromium or cobalt.

The preparation of the catalyst composition of the present invention is explained below.

First, a metal halide of the formula $MeX_n$ (Me is a transition metal of Groups IV to VI and VIII of the Periodic Table, X is halogen and $n$ is a positive integer) is reacted with an ethereal solution of a Grignard reagent ($CH_2\!\!=\!\!CH\text{—}CH_2MgCl$) at the stoichiometric amount or in slight excess amount of $-40°$ C.–$0°$ C. for 1 to 6 hours. After completion of the reaction, an appropriate amount of an aliphatic hydrocarbon, e.g. n-heptane, is added to the reaction mixture in order to separate the unreacted Grignard reagent. The mixture is filtered and the filtrate obtained is allowed to stand overnight at room temperature ($25°$ C.). It is then distilled under reduced pressure to remove the solvent. The solid residue is extracted with n-heptane to obtain a heptane solution of the desired metal-allyl compound which is stable at room temperature ($25°$ C.) for a long period of time. Alternatively, allyl compounds of some transition metals, i.e. Zr, Nb, Ta, Mo and W can be obtained by the methods disclosed in Angewandte chemie 78, 157 (1966).

If an allyl-diene or diene compound of a transition metal is desired, the above-described reaction mixture obtained at $-40°$ C.–$0°$ C. and containing the transition metal-allyl compound (which has a formula of $(CH_2\!\!=\!\!CH\text{—}CH_2)_y Me$ wherein Me is a transition metal of Groups IV to VI and VIII of the Periodic Table and $y$ is a positive integer of not more than 4) is further treated with one or two molar equivalents of an appropriate diene at the same temperature ($-40°$ C.–$0°$ C.) to thereby form the desired allyl-diene or diene compound.

The allyl-diene compound (first component) thus obtained is mixed with the above-mentioned transition metal halide (second component), which is usually commercially available, to thereby form the catalyst composition. Mixing of these two components should preferably be carried out in a liquid medium. A liquid monomeric $\alpha$-olefin to be polymerized can be conveniently used for this purpose. Particular solvents which are usable as the liquid medium are saturated aliphatic, aromatic or alicyclic hydrocarbons which are commonly known as a polymerization medium for $\alpha$-olefins.

Some of the transition metal halides used as the second component are soluble in said hydrocarbon solvents and others are difficultly soluble or insoluble.

If the selected metal halide is uniformly soluble in the solvent used, the resulting solution may be added to a solution of the first component compound, whereupon a precipitate is formed which is a heterogeneous catalyst system. In this case, no aging of the catalyst system is required. If the metal halide is difficultly soluble or insoluble in the solvent, addition of the first component compound will cause a gradual color change of the mixture which is now ready for use as the heterogeneous catalyst system. Mixing can be effected at a temperature of $-100°$ to $100°$ C., and preferably at $0°-50°$ C. The molar ratio of the first component to the second may vary within a wide range from 0.1 to 10, and preferably from 0.2 to 5. Mixing of the first and second components should be done within 24 hours before addition of the resulting catalyst mixture to the polymerization system.

Polymerization of $\alpha$-olefins in the presence of the catalyst composition of the present invention is carried out by using as a solvent a saturated aliphatic hydrocarbon such as pentane, hexane, heptane, etc., or an aromatic hydrocarbon such as benzene, toluene, xylene, etc., or an alicyclic hydrocarbon such as cyclohexane. A mixture of more than two of these named solvents is also usable. These solvents should be free from any impurities which either destroy the activity of the catalyst or prevent the intended polymerization, e.g. unsaturated compounds, carbon monoxide, oxygen, water, etc. It is also possible to carry out the polymerization without using any solvents, i.e. in a monomeric olefin as a so-called non-solvent system. The amount of catalyst composition used may vary within a wide range and even at very low concentrations such as 0.1 mmol of the transition metal contained per liter of solvent used as the polymerization medium is usable.

In the polymerization of ethylene, for example, the use of the catalyst composition as in Example 2 below enables one to effect the desired polymerization with a high polymerization velocity even with a small amount of the catalyst under atomspheric pressure or at a slightly elevated pressure. Polymerization of propylene also can proceed under atmospheric or slightly elevated pressure. In either case, an operating pressure equal to atmospheric pressure or up to 50 atm. is advantageous in effecting an increased reaction velocity.

The term, "the Periodic Table," referred to in this specification is understood to mean Mendelejeff's Periodic Table.

The following examples illustrate the present invention, but the invention is not limited to the examples and various applications are possible within the scope of the invention.

EXAMPLE 1

The amounts of metal halide indicated in Table 1 were reacted with ethereal solutions of allyl magnesium chloride ($CH_2=CH-CH_2MgCl$) under the specified reaction conditions. After completion of the reaction, the indicated amount of n-heptane was added to the reaction mixtures to separate unreacted Grignard reagent. The mixtures were filtered and the filtrates were allowed to stand overnight at room temperature (25° C.). The solvent was removed under reduced pressure and the solid residues were extracted with n-heptane to obtain heptane solutions of the desired metal-allyl compounds. The experimental results of several runs are shown in Table 1.

TABLE 1

| Metal halide, mmol | $CH_2=CH-CH_2-MgCl$, mmol | Reaction temp., ° C. | Reaction time, hr. | Heptane added, cc. | Allyl compound yield,[1] percent |
|---|---|---|---|---|---|
| $TiCl_4$, 2.0 | 8.0 | $-40$ | 1 | 250 | 5.5 |
| $CrCl_3$, 15.0 | 45.0 | $-20-10$ | 6 | 200 | 75.6 |
| $CoCl_2$, 26.8 | 50.4 | $-40$ | 1 | 300 | 26.2 |
| $NiCl_2$, 200.0 | 400.0 | $-10$ | 6 | 1,000 | 86.3 |

[1] Based on MeXn.

EXAMPLE 2

To a suspension of 6.4 g. (0.04 mol) of anhydrous chromium chloride (III) in 50 cc. of anhydrous ether, allyl magnesium chloride (0.12 mol) in ether was added at $-30°$ C. The reaction mixture became deep red. After standing overnight at room temperature (25° C.), the mixture became reddish brown. The ether was removed from the mixture and the residue was extracted with 500 cc. of n-pentane. The extract was freed of the Grignard reagent. The product which crystallized from this extract had a chromium content of 37.41% and a molecular weight of 265 (cryoscopic method). This product substantially corresponds to the empirical formula $Cr_2C_{12}H_{20}$. Yield 50–60%.

EXAMPLE 3

To a suspension of 6.4 g. (0.04 mole) of anhydrous chromium chloride (III) in 50 cc. of anhydrous ether, allyl magnesium chloride (0.12 mole) in ether was added at $-30°$ C. to obtain thereby a red reaction mixture. After completion of the reaction at $-30°$ C. one mol (based on chromium) of 1,3-butadiene was reacted with the said reaction mixture. The reaction took place at $-5°$ C.$-0°$ C. and the color of the resulting reaction mixture immediately changed to dark brown. Stirring was continued at room temperature. The mixture was treated in the same manner as in Example 2, thereby to obtain the first catalyst component which was directly usable for the polymerization.

EXAMPLE 4

To a solution of 4.15 mmols of triallyl cobalt [cited in Angewandte Chemie 78, 157 (1966)] in 100 cc. of pentane 10 mmols of butadiene were introduced with stirring at $-40°$ C. The resulting reaction mixture was brought to 25° C. and kept at this temperature for 5 minutes. The solvent and excess butadiene were removed by distillation under reduced pressure at 0.5 mm. Hg at 20° C. The residual reddish brown oily product was further dried under high vacuum at 20° C. From this oil, a crystalline product was separated as fine needles at $-60°$ C. 4.81 mmols of diallyl was determined by gas chromatography to be present in the recovered solvent. This compound was very air sensitive and decomposed immediately to form a blackish brown precipitate in a solvent when said compound was brought into contact with air. A heptane solution of this compound was used for the polymerization as the first catalyst component.

EXAMPLE 5

According to Example 4, 3.5 mmols of isoprene was introduced to a pentane solution of 1.65 mmols of triallyl cobalt at $-40°$ C. The resulting reaction mixture was treated in the same manner as in Example 4. The reddish brown oily product thus obtained was very air sensitive.

EXAMPLE 6

According to Example 4, 18.0 mmols of cyclooctadiene (1.5) was introduced to an ether solution of 8.28 mmols of triallyl cobalt at −40° C. The resulting reaction mixture was treated in the same manner as in Example 4. The dark brown oily product thus obtained was very air sensitive.

mentioned in Example 1 and prior art literature [Angewandte Chemie 78, 157 (1966)] with (B) halides of transition metals of Groups IV to VI and VIII of the Periodic Table are summarized in Table 2 below:

TABLE 2

| A | | B | | Solvent heptane, cc. | Pressure, kg. cm.$^{-2}$ | Temperature, °C. | Time, min. | Polymer produced, g. | Number average molecular weight ×10$^{-4}$ |
|---|---|---|---|---|---|---|---|---|---|
| Me[1] | mmols | Kind | mmols | | | | | | |
| Ti | 0.16 | TiCl$_4$ | 0.5 | 100 | 30 | 35 | 2 | 12.75 | 80 |
| Zr | 1.24 | TiCl$_4$ | 1.0 | 200 | ($^2$) | 25 | 120 | 8.50 | ---- |
| Zr | 0.50 | TiCl$_4$ | 0.5 | 70 | 38 | 70 | 30 | 21.33 | 80 |
| Nb | 1.00 | TiCl$_4$ | 1.0 | 70 | 35 | 50 | 2 | 15.13 | 80 |
| Ta | 1.00 | TiCl$_4$ | 1.0 | 70 | 45 | 70 | 30 | 0.36 | 67 |
| Cr | 1.00 | TiCl$_4$ | 0.8 | 500 | ($^2$) | 50 | 30 | 62.00 | 55 |
| Cr | 0.50 | TiCl$_4$ | 0.15 | 500 | 4 | 70 | 30 | 250.50 | 65 |
| Mo | 0.36 | TiCl$_4$ | 1.0 | 50 | ($^2$) | 25 | 60 | 0.45 | ---- |
| Mo | 1.00 | TiCl$_4$ | 1.0 | 100 | 45 | 70 | 30 | 2.92 | 80 |
| W | 1.00 | TiCl$_4$ | 1.0 | 70 | 50 | 70 | 30 | 0.20 | 80 |
| Co | 1.54 | TiCl$_4$ | 1.0 | 70 | ($^2$) | 25 | 60 | 0.15 | ---- |
| Co | 1.00 | TiCl$_4$ | 1.0 | 70 | 38 | 70 | 30 | 4.04 | 56 |
| Zr | 1.00 | ZrCl$_4$ | 0.9 | 70 | 36 | 70 | 30 | 2.28 | 80 |
| Cr | 3.50 | ZrCl$_4$ | 3.5 | 90 | ($^2$) | 25 | 60 | 0.21 | ---- |
| Cr | 1.00 | ZrCl$_4$ | 0.9 | 70 | 37 | 70 | 30 | 14.88 | 80 |
| Cr | 1.50 | VCl$_4$ | 1.0 | 500 | ($^2$) | 35 | 30 | 46.00 | 80 |
| Cr | 1.50 | VOCl$_3$ | 1.0 | 500 | ($^2$) | 50 | 30 | 16.50 | 68 |
| Cr | 1.00 | NbCl$_5$ | 0.8 | 70 | 38 | 70 | 60 | 9.76 | 80 |
| Cr | 1.00 | TaCl$_5$ | 0.9 | 70 | 39 | 70 | 60 | 2.90 | 80 |
| Zr | 1.00 | MoCl$_5$ | 1.0 | 70 | 35 | 70 | 30 | 0.67 | 80 |
| Cr | 4.20 | MoCl$_5$ | 4.2 | 110 | ($^2$) | 25 | 60 | 0.08 | ---- |
| Cr | 1.00 | MoCl$_5$ | 0.7 | 70 | 37 | 70 | 60 | 14.03 | 80 |
| Cr | 1.00 | WCl$_6$ | 0.8 | 70 | 37 | 70 | 60 | 3.65 | 80 |
| Cr | 1.00 | NiCl$_2$ | 1.1 | 70 | 37 | 70 | 60 | 7.48 | 68 |

[1] Means a kind of transition metal contained in A.
[2] Atmospheric.

EXAMPLE 7

According to Example 4, 4.9 mmols of cyclopentadiene was introduced to a pentane solution of 2.45 mmols of triallyl cobalt at −40° C. The resulting reaction mixture was treated in the same manner as in Example 4. The red oily product thus obtained was rather stable against air and acid.

EXAMPLE 8

Into 1.48 mmols of the chromium compound obtained in Example 2 and 2.0 mmols of titanium tetrachloride, ethylene was blown at room temperature using heptane as a solvent. In this case, instant formation of a brown precipitate was observed when titanium tetrachloride was added to a transparent reddish brown heptane solution of the chromium compound. When the blowing time of ethylene reached 1 minute, the polymerization was discontinued by the addition of methanol and the thus obtained polymer was washed with methanol and dried. 5.5 g. of white powdery polyethylene having a melting point of 128° C. was obtained.

EXAMPLE 9

Into 1.78 mmols of the chromium compound obtained in Example 3 and 2.0 mmols of titanium tetrachloride, ethylene was blown at room temperature using heptane as a solvent. When the blowing time of ethylene reached 5 minutes, the polymerization was discontinued and the resulting polymer was washed and dried. 4.5 g. of white powdery polyethylene having a melting point of 135° C. was obtained.

EXAMPLE 10

When ethylene was polymerized as in Example 8 by using titanium trichloride in place of titanium tetrachloride, 2.0 g. of white powdery polyethylene was obtained after a blowing time of 15 minutes.

EXAMPLE 11

The results obtained by the polymerization of ethylene using various catalyst compositions prepared by combining (A) the various transition metal-allyl compounds

EXAMPLE 12

Using 1.0 mmol of the cobalt compound obtained in Example 4 and 1.0 mmol of titanium tetrachloride, ethylene was polymerized in an autoclave using 70 cc. heptane as solvent at a maximum pressure of 35 atms. at 70° C. for 30 minutes. 3.2 g. of polyethylene was obtained.

EXAMPLE 13

Using 1.6 mmols of the cobalt compound obtained in Example 6 and 1.0 mmol of titanium tetrachloride, ethylene was polymerized in an autoclave using 70 cc. heptane as solvent at a maximum pressure of 38 atms. at 70° C. for 30 minutes. 5.1 g. of polyethylene was obtained.

EXAMPLE 14

In a 300 cc. autoclave were charged 1.45 mmols of the chromium compound obtained in Example 2 and 1.4 mmols of titanium trichloride together with 50 cc. of heptane as solvent. The polymerization was conducted at 70° C. for 2 hours using propylene at a constant pressure of 9 atms. 1.7 g. of white powdery polypropylene was obtained, which contained 83% of a highly crystalline polymer which is insoluble in boiling heptane and having a melting point of 172° C.

EXAMPLE 15

In a autoclave were charged 0.95 mmol of the chromium compound obtained in Example 3 and 1.9 mmols of titanium trichloride together with 50 cc. of heptane as solvent. The polymerization was conducted at 70° C. for 2 hours using propylene at a constant pressue of 12 atms. 5.7 g. of white powdery polypropylene was obtained, which contained 85% of a highly crystalline polymer which is insoluble in boiling heptane and having a melting point of 166° C.

EXAMPLE 16

The results obtained by the polymerization of propylene using various catalyst compositions prepared by combining (A) the various transition metal-allyl compounds obtained in Example 1 and prior art literature [Angewandte Chemie 78, 157 (1966)] with (B) halides of transition metals are summarized in Table 3 below.

TABLE 3

| A | | B | | Propylene charged, g. | Solvent heptane, cc. | Pressure, kg. cm.$^{-2}$ | Temperature, °C. | Time, min. | Polymer produced, g. | Number average molecular weight ×10$^{-4}$ | Boiling heptane-insoluble parts, percent |
|---|---|---|---|---|---|---|---|---|---|---|---|
| Me [1] | mmol | Kind | mmol | | | | | | | | |
| Zr | 1.30 | TiCl$_3$ | 1.30 | 187 | 0 | 31 | 70 | 60 | 72.4 | >100 | 77.1 |
| Nb | 1.00 | TiCl$_3$ | 1.00 | 180 | 0 | 31 | 70 | 60 | 22.2 | >100 | 68.3 |
| Cr | 1.78 | TiCl$_3$ | 2.00 | | 100 | ([2]) | 80 | 20 | 1.0 | 32 | 73.5 |
| Cr | 1.32 | TiCl$_3$ | 1.32 | | 200 | ([3]) | 70 | 60 | 32.5 | 58 | 54.0 |
| Cr | 1.30 | TiCl$_3$ | 1.30 | 165 | 0 | 31 | 70 | 60 | 85.0 | >100 | 58.5 |
| Mo | 0.44 | TiCl$_3$ | 0.50 | 130 | 0 | 31 | 70 | 60 | 0.1 | | |
| Cr | 1.30 | TiCl$_4$ | 1.30 | 180 | 0 | 31 | 70 | 60 | 31.2 | 62 | 25.0 |
| Mo | 0.47 | TiCl$_4$ | 0.50 | 185 | 0 | 31 | 70 | 60 | 0.1 | | |
| Cr | 1.30 | VCl$_3$ | 1.30 | 180 | 0 | 31 | 70 | 60 | 0.2 | | |
| Cr | 1.30 | VCl$_4$ | 1.30 | 190 | 0 | 31 | 70 | 60 | 6.2 | 74 | 43.0 |
| Cr | 1.30 | VOCl$_3$ | 1.30 | 180 | 0 | 31 | 70 | 60 | 0.5 | | |

[1] Means a kind of transition metal contained in A.
[2] Atmospheric.
[3] Constant.

What we claim is:

1. A catalyst composition for the polymerization of α-olefins, which consists essentially of a halide or oxyhalide of a transition metal of Groups IV to VI and VIII of the Periodic Table and an organometallic compound of the formula $$[(CH_2=CH-CH_2)_m Me(diene)_n]_x$$

wherein Me is a transition metal of Groups IV to VI and VIII of the Periodic Table, diene represents a diolefinic hydrocarbon selected from the group consisting of butadiene, isoprene, hexadiene, cyclopentadiene and cyclooctadiene, $m$ is a positive integer of not more than 4, $n$ is a positive integer of not more than 2; and $x$ is 1 or 2, the molar ratio of the halide or oxyhalide to the organometallic compound being from 1:10 to 10:1.

2. A method for the preparation of the catalyst composition of claim 1 which comprises treating a transition metal-allyl compound of the formula:

$$(CH_2=CH-CH_2)_y Me$$

wherein Me is a transition metal of Groups IV to VI and VIII of the Periodic Table and $y$ is a positive integer of not more than 4 with a diene compound selected from the group consisting of butadiene, isoprene, hexadiene, cyclopentadiene and cyclooctadiene at a temperature of −40° C. to 0° C. to thereby obtain an organometallic compound of the formula:

$$[(CH_2=CH-CH)_m Me(diene)_n]_x$$

wherein Me is as defined above, $m$ is a positive integer of not more than 4, diene means said diene compound referred to above, $n$ is a positive integer of not more than 2; and $x$ is 1 or 2, and mixing same, just before its addition to a polymerization system, with a halide or oxyhalide of a transition metal of Groups IV to VI and VIII of the Periodic Table.

3. A catalyst composition as claimed in claim 1, wherein the halide or oxyhalide of a transition metal is a halide or oxyhalide of titanium and Me is chromium or cobalt.

4. A method as claimed in claim 2, wherein Me is chromium or cobalt and the halide or oxyhalide of a transition metal is a halide or oxyhalide of titanium.

References Cited

UNITED STATES PATENTS 2,992,212   7/1961   De Butts.
3,075,957   1/1963   D'Alelio.
3,400,115   9/1968   Dawans et al.

PATRICK P. GARVIN, Primary Examiner

U.S. Cl. X.R.

260—93.5, 93.7, 94.9